United States Patent
Jones et al.

(12) 
(10) Patent No.: US 6,546,023 B1
(45) Date of Patent: Apr. 8, 2003

(54) SWITCH VOICE/DATA SERVICE EXTENSION TO REMOTE FACILITIES

(75) Inventors: Barry W. Jones, Hoffman Estates, IL (US); Steven T. Delong, Woodridge, IL (US); Jerrold S. Zdenek, Riverside, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/405,585

(22) Filed: Sep. 27, 1999

(51) Int. Cl.[7] .................................................. H04J 3/16
(52) U.S. Cl. ...................................................... 370/468
(58) Field of Search .......................... 370/468, 389–395; 496/263; 485/455–465; 522/352–355; 231/389–395; 455/403, 428, 12.1, 554, 456; 348/14.12; 375/222; 340/825.5; 379/265.11, 93.09–93.29, 139, 224–229; 265/269, 242, 224–229, 212, 233–235, 111, 164, 88.25, 88.22

(56) References Cited

U.S. PATENT DOCUMENTS 5,526,417 A  *  6/1996  Dezonno .................... 379/265
5,544,232 A  *  8/1996  Baker et al. ................. 379/210
5,991,390 A  * 11/1999  Booton ........................ 379/265
6,061,347 A  *  5/2000  Hollatz et al. ............... 370/352
6,118,763 A  *  9/2000  Trumbull ..................... 370/231
6,314,176 B1 * 11/2001  Gunasekar ................... 379/219

* cited by examiner

Primary Examiner—Kwang Bin Yao
Assistant Examiner—Prenell Jones
(74) Attorney, Agent, or Firm—Welsh & Katz, Ltd.

(57) ABSTRACT

A method and apparatus are provided for exchanging control information and voice data between an automatic call distributor and a line card of the automatic call distributor located at a site remote from the automatic call distributor through a wide-bandwidth communication channel. The method includes the step of allocating at least a first portion of the bandwidth of the wide-bandwidth communication channel for the control information and at least a second portion of the bandwidth to voice data. The interprocessor control information is transceived between a controller of the automatic call distributor and a controller of the line card under a packet data format within the first portion of the bandwidth allocated for control information and the voice data is transceived under a dedicated channel format within the second portion of the bandwidth between the automatic call distributor and line card.

42 Claims, 2 Drawing Sheets

SWITCH VOICE/DATA SERVICE EXTENSION TO REMOTE FACILITIES

FIELD OF THE INVENTION

The field of the invention relates to communication systems and more particularly to automatic call distributors.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In order to route calls, the ACD is provided with a matrix switch capable of connecting any first port to any second port of the switch. A controller of the ACD routes calls by forming connections within the matrix switch.

Incoming calls typically arrive at ports of the matrix switch through one or more trunk connections with a public switched telephone network (PSTN). Upon detecting an incoming call, the ACD may accept or reject the call. To accept the call, the controller may send an accept message over a control path to the PSTN. Upon acceptance of the call, the call is connected by the PSTN through the incoming trunk to a port of the matrix switch. Once the incoming call arrives at the switch of the ACD, any of a number of ACD system resources (e.g., an agent, a voice response unit (VRU), etc.) may be used in support to service the call.

For example, based upon the type of call, the controller may select an agent to service the call. Upon selecting an agent, the controller may send instructions to the matrix switch causing the port of the incoming call to be connected to a port of the selected agent.

In the alternative, where all agents are busy, the call may be placed in a queue in anticipation of the next available agent. While in the queue, a voice response unit connected to another port of the switch may be coupled to the call to present the caller with a set of options. A tone detector/voice analyzer may, in turn, detect a response from the caller. The tone detector/analyzer may be coupled to a host computer which routes the call accordingly, depending upon the response entered.

For large organizations, an ACD may require large numbers of agents and the ability to handle a large number of calls. Further, for large organizations, it may be necessary to staff agent positions from 8 am, New York time to 6 p.m. San Diego time. However, in some locals, it is difficult to recruit sufficient numbers of agents or provide adequate supervision or training.

Further, as ACDs are currently constructed, it is difficult to position agents any more than 1,000 meters from the switch of the ACD. Where longer distances are required, channel bank or multiplexer boxes and the use of private lines are used to support ACD system resources (e.g., agent centers) at remote locations.

While channel bank or multiplexer boxes are effective, they are: a) limited to a dedicated functionality, or b) require a complex architecture/implementation to support a wider range of functionality. For example, where a channel bank box or multiplexer box is provided for analog circuits, that box may be limited to analog circuits. Because of the importance of ACDs, a need exists for a simpler means of locating and operating the functional resources of ACD systems from remote locations.

SUMMARY

A method and apparatus are provided for exchanging control information and data between an automatic call distributor and a line card of the automatic call distributor located at a site remote from the automatic call distributor through a wide-bandwidth communication channel. Operation of the line card when employed at the remote site with intervening wide-bandwidth communications channel is exactly the same as if the line card were inserted directly into a switch of the automatic call distributor. The method includes the step of allocating at least a first portion of the bandwidth of the wide-bandwidth communication channel for the control information and at least a second portion of the bandwidth to data. The interprocessor control information is transceived between a controller of the automatic call distributor and a controller of the line card under a packet data format within the first portion of the bandwidth allocated for control information and the data is transceived under a dedicated channel format within the second portion of the bandwidth between the automatic call distributor and line card.

Typically voice data is passed between an ACD and the line card of the ACD in the second portion of bandwidth in this dedicated channel format. Alternatively, packet format data may be transferred between the ACD and the line card of the ACD within the fixed bandwidth allocated under the dedicated channel format. The wide-band channel may thus contain in that portion of the bandwidth allocated in dedicated channel format a mix of voice channels and packetized data channels.

DETAILED DESCRIPTION OF A PREFERRED EMBODIMENT

Figure 1:
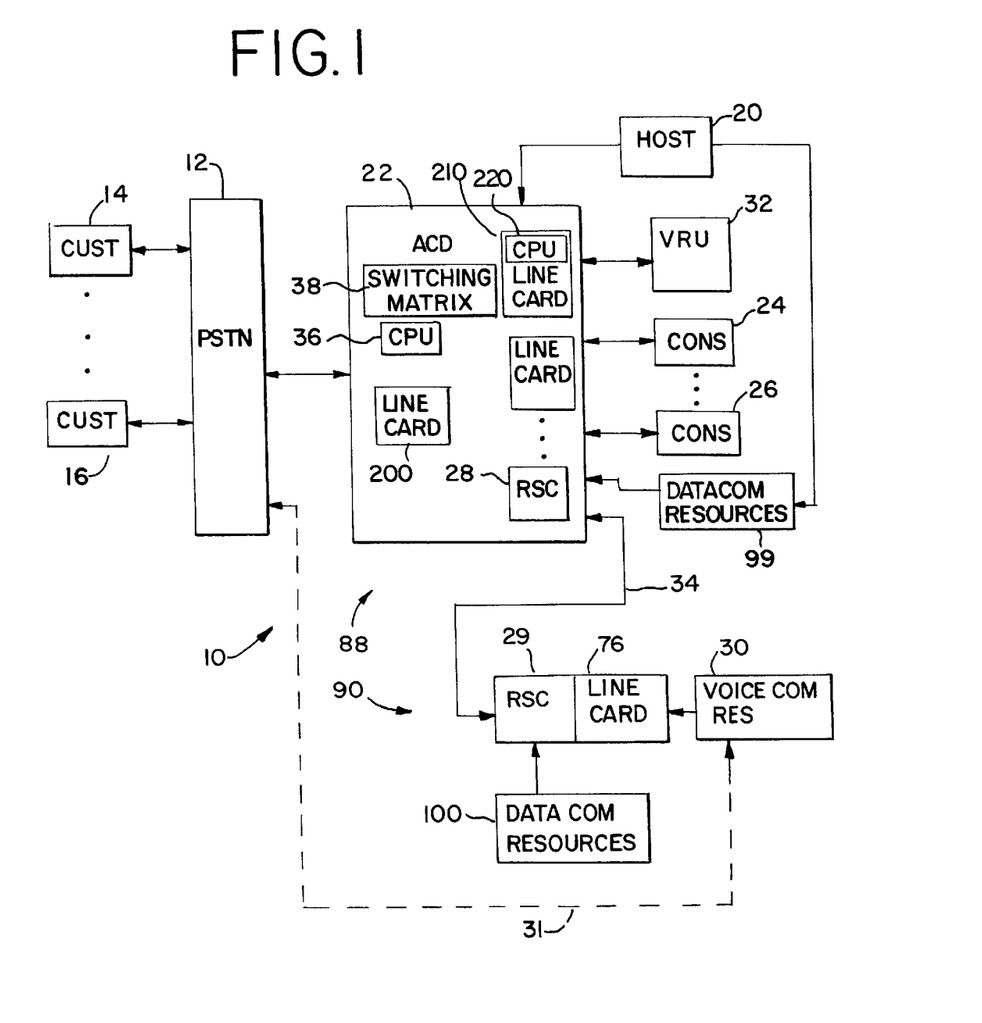
FIG. 1 is a block diagram of a automatic call distributor system in accordance with an illustrated embodiment of the invention.

FIG. 1 is a block diagram of an automatic call distributor system (ACD) 10, generally in accordance with an illustrated embodiment of the invention. As shown the ACD 10 may be connected to and receive calls from (and place calls to) customers 14, 16 through the PSTN 12. As calls are received from (placed to) customers 14, 16, they may be delivered along with call-associated information (e.g., ANI, DNIS, etc.) from the PSTN 12 to the ACD 10.

Included with the ACD system 10 may be a number of agent consoles 24, 26. The agent consoles 24, 26 provide workstations for a number of agents who function to service calls with customers 14, 16. Each agent console 24, 26 may include a standard plain-old-telephone-service (POTS) telephone, an ISDN telephone, or a personal computer (PC) with telephony capability.

As calls with customers 14, 16 are delivered through the PSTN-12, a controller 36 (e.g., a CPU) within the ACD 22 receives the call associated information and by reference to a database (potentially within an external host 20), selects a resource (e.g., an agent 24, 26) to service the call. The controller 36 may select an agent based upon the number called, the identity of the customer 24, 26, the skill set of the available agents, etc.

Where the call is an incoming call, the agent may be selected based upon the number called. For instance, where the owner and operator of the ACD system 10 is a department store, a number of telephone numbers may be disseminated to the public as a means of identifying various departments (e.g., men's clothing, woman's clothing, etc.). DNIS information delivered along with the call may be used to select an agent qualified to answer questions about the department dialed.

ANI information (or a dialed number for an outgoing call) may be used to further refine agent selection. A database within an external host 20 may be referenced based upon the ANI (or dialed number) to identify the customer (and customer records). Upon delivery of the call to an agent console 24, 26, customer information may be simultaneously displayed upon the agent's screen (i.e., the agent's CRT) as an aid to servicing the call.

When all agents are busy upon completion of the call connection with the customer 24, 26, the call may be connected to another alternate resource (e.g., a voice response unit (VRU) 32). The VRU 32 may function to present the customer with a recorded message setting forth a number of options. The customer 14, 16 may respond by activating a touch-tone button on his telephone to select an option. A tone detector within the VRU 32 may be used to identify the particular button pressed.

The option selected by the customer 14, 16 may be used to activate any of a number of features of the ACD system 10. For example, selection of a call-back request may be used along with ANI information to generate a call-back to the customer 14, 16 at a later time. Depending upon options selected, the CPU 36 may be able to make a better choice of the agent selected to service the call. Further, depending upon the options offered and selected and further upon the information entered through the customer's telephone, the customer may be able to complete a transaction (e.g., a purchase) without ever talking to an agent 24, 26.

Within the ACD 22, external connections to system elements, such as a VRU 32, or consoles 24, 26 are made via line cards with specific functionality, such as analog interface line cards, ISDN S-Interface line cards, and T1/E1 Interface line cards. The line cards are each used to connect the switching matrix and control elements of the ACD with external system elements as a means for exchanging voice and control information.

Under an illustrated embodiment of the invention, voice communication (voice comm) resources 30 of the ACD system 10 may be provided in locations which are geographically remote from the ACD 22. The voice comm resources 30 may be used to service calls through a wide-bandwidth communication channel 34 and a pair of remote system controllers (RSCs) 28, 29 which interconnects the voice comm resources 30 with the ACD 22.

The voice comm resources 30 may include one or 30 more consoles 24, 26 and/or VRUs 32. For example, under one illustrated embodiment the resources 30 may include 24 ISDN telephones or one VRU 32 connected to the RSC 29. Alternatively, the resources 30 may include 24 analog telephones. Additionally, the RSCs 28, 29 provide a means for interconnecting data comm equipment 99 at the ACD site 88 to data comm equipment 100 at the geographically remote site 90 via the wide-band channel 34. As used herein, data comm equipment may include host computers, computer terminals, data displays (such as CRTs), etc. Allocation of bandwidth on the wide-band channel 34 may be made to support connection of, for example, 12 or more ISDN telephones between the remote geographic site and the ACD and to support connection of terminals or CRTs at that remote geographic site to a host computer connection available at the ACD site (i.e., the host is computer need not be co-located with the ACD 22).

Figure 2:
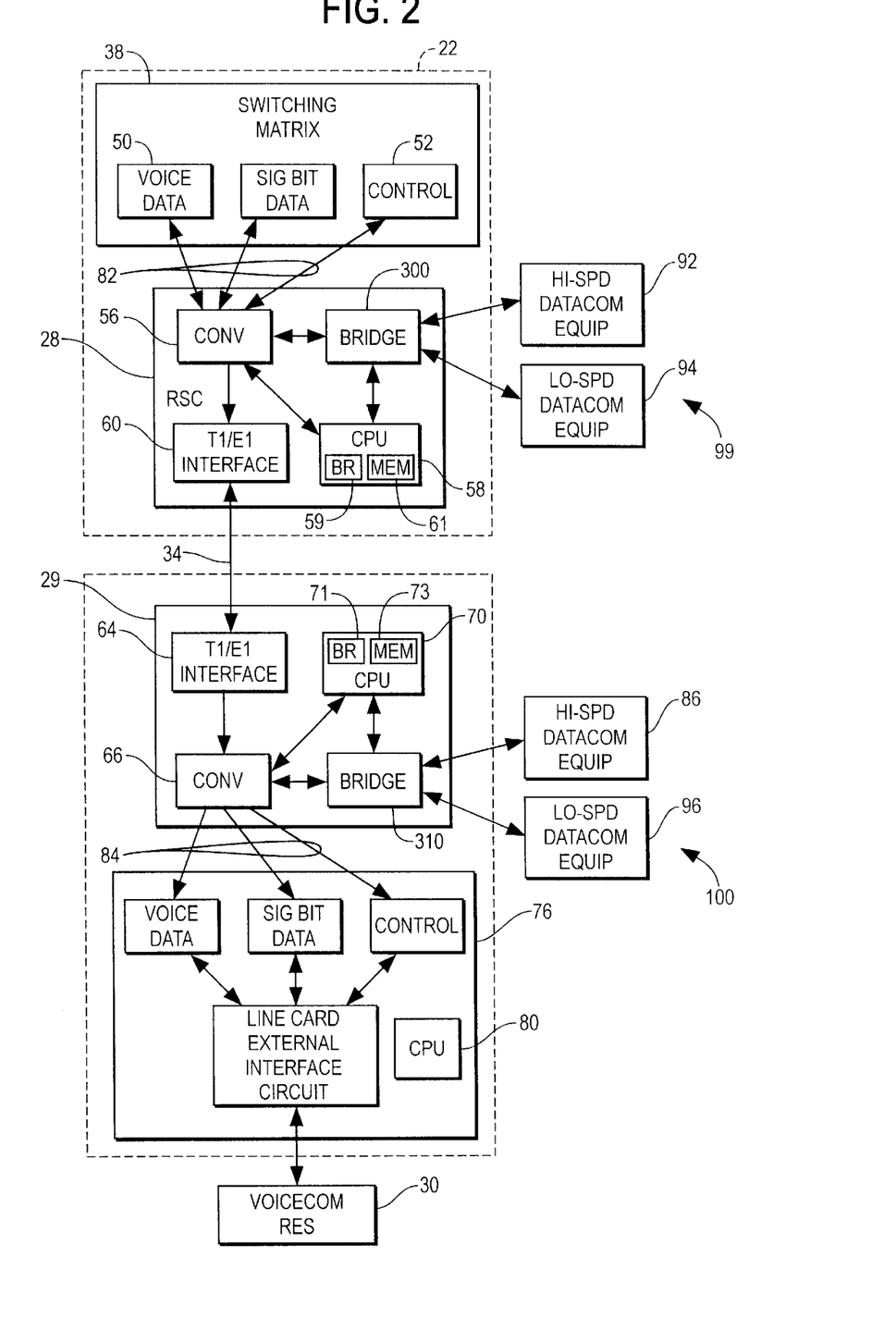
FIG. 2 is a block diagram of a structure of the system of FIG. 1 wherein a wide-bandwidth communication channel is used to extend voice and data services to equipment at a geographically remote site.

FIG. 2 is a block diagram of the wide-band communication channel 34 and RSCs 28, 29 needed for such remote operation. As shown, the line card 76 (originally connected directly to the switching matrix 38) is moved to the remote location 90 and is interconnected with the switching matrix 38 through use of the RSCs 28, 29 and wide-band channel 34.

In general, operation of a line card when employed at the remote site with intervening RSC cards and wide-band channel is exactly the same as if the line card were inserted directly into the switch. The use of the RSC cards, connected via the wide-band channel is transparent to the interoperation of the switch and the line card.

However, the RSC provide additional functionality in addition to that related to line card operation. For example, external data interfaces on the RSC cards provide the additional capability of interconnecting datacomm equipment between the switch and remote sites.

Line cards connect external peripherals to control and switching elements of the ACD 22 and function to exchange interprocessor control information, signaling control information and voice data between the switch and external equipment, such as, the PSTN 12, agent consoles 24, 26, etc. For example, the line card 200 of FIG. 1 could be a primary rate interface (PRI) card used to connect the ACD 22 to the PSTN 12. The line card 210 of FIG. 1 could be a DS1 Port Card (DPT) or an analog interface card (AIC) to a VRU 32.

ACDs 22, such as that shown in FIG. 1 typically use a proprietary interface between the switching and control fabric of the switch 38 and a line card which interfaces with external resources 24, 26, 30, 32. For example, one manufacturer of ACDs uses a timeslot interchange arrangement whereby a line card is assigned predetermined locations on a repeating TDM frame within the switch 38 for exchanging interprocessor control information, signaling control information and voice data. Other manufacturers may place interprocessor control information and/or signaling information on a separate bus.

The following description will be based upon the assumption that the ACD 22 uses a timeslot interchange bus. However, it should be understood that the invention applies to any interface format.

As used herein, interprocessor control information is control information exchanged between the CPU 36 of the ACD 22 and a CPU associated with, for example, the CPU 220 of the line card 210. Alternatively, the associated CPU may be the CPU 70 of line card 76 connected via elements 29, 34 and 28 to the switching matrix and control elements of the ACD 22. Interprocessor control information relates to operations performed within the ACD system 10 for purposes of servicing a call. For example, in the case of the VRU 32, an interprocessor signaling command may be sent from the CPU 36 of the ACD 22 to select a particular menu for presentation to a particular caller through a VRU 32. Once a caller has entered a selection, an interprocessor signaling response from the CPU 220 of the line card to the CPU 38 of the ACD returns the selection of the caller to the ACD 22.

As used herein, signaling control information is channel control and channel associated control information. For example, if the resource 30 were an ISDN telephone with one D-channel and two B-channels, then signaling information arriving on the D-channel announcing the arrival of a call would be defined as signaling information. In general, anything transferred on the D-channel and associated with call set-up or tear-down would be signaling information.

Alternatively, control of a voice channel may be accomplished from within the voice channel itself. For example, channel associated control information may be exchanged between controllers by bit substitution (stolen bits) within a stream of PCM data.

As used herein, voice data is an electronic representation of a voice signal. Typically the voice data is exchanged under a PCM format. Voice data may be analog or digital.

Under the illustrated embodiment, the first RSC 28 receives interprocessor control information, signaling control information, and voice data under a first format from the switch 22 and converts it to a second format compatible with the wide-bandwidth transmission channel 34 operating under an appropriate format (e.g., T1, E1, etc.). At the remote location, a second RSC card 29 receives the control information, and voice data from the wide-bandwidth communication channel under the second format, recovers the control information and voice data, and converts it back to the first format. The recovered information may be provided as an input to the line card 76.

To transmit information and data through the wide-bandwidth communication channel 34, any of a number of formats may be used. Under one embodiment, a repeating frame of 24 slots may be used at a rate of 1.5 Mbits/s. The slots of the wide-bandwidth communication channel may be divided among a number of uses. For instance, a first portion of the slots may be used for control information (control slots) and a second portion may be dedicated to channel data (channel slots). The channel data may be voice or data communication information transmitted through a voice channel. Moreover any ratio of control to channel slots may be used depending upon the requirements of the remote site.

One difference between the control slots and channel slots lies in the flexibility of use. For example, a particular slot on the wide-band connection 34 used for channel data may be associated with a particular port of the switch 38 on one end and with a particular voice resource (e.g., a telephone of an agent, a port of a VRU, a PSTN trunk line, etc.) on the other end. In contrast, control slots may be easily put to any control use.

Moreover, control information placed in the control slots may be exchanged over the communication channel 34 under a packet format. The use of a packet format allows for flexibility of use by providing the destination of each packet in a header of the packet. Providing the destination of each packet in the header allows for the efficient transmission of control information without a priori knowledge of a packet's destination. Similarly, data communications information which are allocated channel slots of the bandwidth in the communications channel 34 may likewise employ a packet format.

Under the illustrated embodiment, slots #1–20 of the repeating frame transmitted through the communication channel 34 may be dedicated for exchanging information between ports #1–20 of the switch 38 and ISDN telephones #1–20 of the resources 30. Contiguous slots #20–24 may be used for control information.

Where the ACD 22 operates under a timeslot interchange format, ports #1–20 may occupy the first 20 slots of a repeating TDM frame operating on an internal bus of the ACD 22. Signaling control information relating to ports 1–20 may be found within the same or some other assigned timeslot. Similarly, interprocessor control information may be found within the same or some other assigned timeslot.

During startup, the CPU 58 of the first RSC may be programmed to look at the assigned ACD timeslots of its particular line card 76 within the bus of the ACD 22. Similarly, the CPU 70 of the second RSC 62 may be programmed to exchange information and data on corresponding timeslots of a repeating TDM frame, which it maintains on a connection 84 with the line card 76. The repeating TDM frame on the connection 84 emulates the repeating TDM frame within the ACD 22 and provided on the ACD interface 82.

In order to serve its intended function, the converters 56, 66 function as timeslot interchange circuits operating between the first and second formats. Under the illustrated embodiment, the converters 56, 66 receive slot identifying information from the CPUs 58, 70 regarding the location of voice and control information under the first format. The CPUs 58, 70 also provide the converters 56, 66 with the location of corresponding slot locations under the second format. During operation, the converters 56, 66 exchange voice and control information between identified slots of the switch 38 (and line card 76) under the first format and corresponding slots of the wide-band channel 34 under the second format.

The bridge circuits 300, 310 may be routers, although a device much less sophisticated than a router may be used to provide the required functionality of the bridges 300, 310. The converters 56, 66 function to route packet data between the bridges and slots identified by the CPUs 58, 70.

The bridge circuits 300, 310, converters 56, 66 and wide-band channel 34 (in addition to providing a remotely available control connection with the switch 38) also function to provide a data connection (e.g., a Smart Bridge) between datacomm resources 99 located at the ACD 22 and datacomm resources 100 located remotely. Such connection may be provided within a third portion of the bandwidth of the wide-band communications channel and may be used to support a synchronous connection (e.g., a LAN) interconnecting high speed datacomm equipment 86, 92 at the ACD location 88 and remote site 90. The connection may also be configured as an asynchronous connection (e.g., RS232) to connect low-speed datacoimn equipment 94, 96 at the ACD location 88 and remote site 90.

By way of example, during operation of the ACD system 10, a call may arrive and be assigned by the CPU 36 of the ACD 22 to a first telephone associated with its first timeslot (i.e., port #1 of switch 38). In anticipation of connection of the call to the first telephone, the CPU 36 of the ACD 22 may forward a signaling message in the form of a CALL ALERT. The CPU 58 of the first RSC 28 detects the signaling message in an assigned signaling timeslot of the TDM frame of the ACD 22. Since the message was detected in an assigned signaling timeslot, the CPU 58 knows that it is a signaling message and that it is to be forwarded to the CPU 80 of the line card 76.

To forward the CALL ALERT, the CPU 58 composes a packet message to the CPU 80. The message may be composed with a header including an IF address of the CPU 80. (It should be noted at this point that even though the packet is addressed to the CPU 80, it would not be delivered to the CPU 80 in a packet format, but instead would be converted back into the first format for delivery to the CPU 80.) A length of the packet and other routing information may be included in the header. Finally, the packet may be terminated with an appropriate error correction code (e.g., CRC).

Upon composing the packet message, the CPU 58 sends the message to a converter 56 which assembles the packet into the repeating 24 slot frame of the wide-bandwidth communication channel 34. In the above example where contiguous slots #20–24 are designated for control information, the packet is inserted into slots #20–24.

Once the frame is assembled, it is transferred to the T1/E1 interface 60. The T1/E1 interface 60 may be any appropriate high speed bi-directional communication interface (e.g., a 1.5 Mbyte transceiver).

From the first T1/E1 interface 60, the frame (and included packet) are transmitted to the second T1/E1 interface 64 where the 24-slot frame is recovered. From the T1/E1 interface 64, the 24-slot frame is transferred to a converter 66. Within the protocol converter 66, the transmitted packet is reconstructed from one or more successive 24-slot frames and transferred to the bridge circuit 310.

Within the bridge circuit 310, the header is decoded and a destination retrieved. Upon decoding the header, the bridge circuit 310 determines that the CPU 80 is the destination of the packet and routes the packet accordingly to the CPU 70 of the RSC 29.

Within the CPU 70, the header and any error correcting information is stripped off and processed. The packet is checked for errors and corrected, if possible. Once any errors have been corrected, the CPU 70 reformats the CALL ALERT message into the first format found on the repeating frame used within the ACD 22 and transfers the CALL ALERT message to the CPU 80 of the line card 76.

Within the CPU 80, the CPU 80 recognizes the signaling information as a CALL ALERT and formulates an appropriate command for transfer to the first telephone. The command may be transferred over the D-channel associated with the telephone and the telephone begins to ring.

Once the first telephone is answered, the first telephone transfers a CALL ANSWERED message back over the D-channel to the line card 76. The CPU 80 receives the CALL ANSWERED message, recognizes it as signaling information as places it in its assigned signaling slot of the repeating frame used across signaling link 84.

The CPU 70 of the second RSC 29 detects the CALL ANSWERED message in the assigned signaling slot of link 84 and composes another packet message for transmission to the switch 22. The packet message is transferred to the bridge circuit 310, which in turn transfers it to the converter 66 which inserts it into contiguous slots #20–24 of the second format for transmission across the communication channel 34 to the first RSC 28.

Within the first RSC 28, the packet is reconstructed as it flows through slots #20–24 into the converter 56 and is transferred to the CPU 58. Within the CPU 58, the header and any error correcting information is stripped off and processed. The packet is again checked for errors and corrected, if possible. Once any errors have been corrected, the CPU 58 reformats the CALL ANSWERED message into the first format found on the repeating frame used within the ACD 22 and transfers the CALL ANSWERED message to the CPU 36 of the ACD 22 through the switch 38 under the first format.

Once the CPU 36 of the ACD 22 receives the CALL ANSWERED message, the CPU 36 may connect the incoming call to a port associated with the first telephone (e.g., port #1). The CPU 58 of the first RSC 28 detects the pulse code modulated (PCM) data in slot #1 of the bus of the ACD 22 and transfers it to slot #1 of the frame transmitted across the communication channel 34.

Within the second RSC 29, the PCM data in slot #1 of the frame transmitted across the communication channel 34 is detected within the protocol converter 66 and placed into the corresponding slot under the first format used over link 84. The line card 76 recognizes the PCM data as being directed to the first telephone and routes the PCM voice data accordinyly.

At the same time as voice data is detected and transferred from port #1 of the ACD 22, voice data is received in the other direction from the first telephone and transferred to the ACD 22. As above, the data from the first telephone may be received under a BRI format on a B-channel and converted to the first format for transfer across the link 84 to the second RSC 29. Within the second RSC 29, the data is converted to the second format for transmission to the first RSC 28. Within the first RSC 28, the data is converted back to the first format and inserted into slot #1 of the repeating frame used within the ACD 22.

As another example, the resource 30 may be 24 telephones (hereinafter for this example "telephones #1–24"). The telephones may operate under an ISDN format or may be "POTS" telephones, with an appropriate line card(s) 76.

Under the illustrated embodiment of this example, the PCM data for support of the 24 telephones may be exchanged by dedicating 12 slots (e.g., #1–12) of the 24 slots of the frame exchanged over the communication channel 34 to PCM voice data. The remaining slots (i.e., #13–24) may be dedicated to exchanging control information. This may be accomplished by compressing the PCM data within the dedicated slots (i.e., #1–12). Signaling information exchanged by the line card 76 with the telephones over corresponding D-channels may be segregated and packetized for transfer to the ACD 22 through the control slots (i.e., #13–24).

Further, reserving slots #13–24 as control slots also provides sufficient capacity to sustain an Ethernet connection through the RSCs 28, 29. A local area network (LAN) of terminals 86 may be supported through bridge circuits 300, 310. Under the embodiment, a separate terminal 86 may be provided for each telephone #1–24.

Under the illustrated embodiment, the wide-bandwidth communication channel 34 may be supported through any of a number of communication paths (e.g., leased lines, virtual private lines, satellite links, etc.). At a physical level the communication channel 34 may be a four-wire circuit. The use of the wide-bandwidth communication channel 34 and RSCs 28, 29 allows a group of agents to be located remotely from the ACD 22, with full access to the resources of the ACD 22.

For example, an incoming call may be received by the ACD 22 from the PSTN 12. The CPU 36 may identify the caller based upon ANI information and select an agent assigned to one of the 24 telephones (hereinafter for this example, the telephone of the assigned agent will be referred to as the "telephone 30") and one of the 24 terminals (hereinafter for this example the terminal of the assigned agent will be referred to as the "terminal 86").

The CPU 36 may send a CALL ALERT signaling message to the telephone 30, as described above. The agent may answer the telephone 30, resulting in a CALL ANSWER message being returned to the CPU 36. The CALL ANSWER signaling message may cause the CPU 36 to begin exchanging voice data with telephone 30, also as described above.

Using the ANI information delivered along with the incoming call, the host 20 may identify a set of customer records associated with the originator of the incoming call. Also, in knowing the identify of the agent assigned to the call, the host may also identify the terminal 86 assigned to the agent. Upon determining an identifier of the terminal 86, the host may transfer the records to the ACD 22 along with an identifier of the terminal 86.

By reference to a memory within the CPU 36, the CPU 36 may determine that information to the terminal 86 may be directed to the terminal 86 through an appropriate interprocessor timeslot of the internal bus of the ACD 22. The timeslot may be a timeslot dedicated to the terminal 86 or a generic interprocessor timeslot dedicated for communicating interprocessor information with the line card 76. Where the timeslot is a generic timeslot, the CPU 36 may compose a packet message (including header) identifying the recipient 86 of the packet.

In either case, the CPU 58 of the first RSC 28 receives the customer information and if not received under a packet format proceeds to compose a packet message including a header identifying the terminal 86. If the information is already in a packet format, the CPU 58 simply captures the information from the assigned timeslot and transfers the information to the converter 56.

Within the protocol converter 56, the packet of information may be inserted into timeslots #13–24. Insertion of the packet information may be accomplished under any of a number of different formats. For example, if there were no other message waiting to be sent, then the header may be placed into slot #13, with each succeeding byte placed in a succeeding slot. If there were a previous message waiting, then the header of the packet may be placed in a later slot with a remainder of the packet in the same or possibly in a succeeding frame.

The packet message is transferred to the second RSC 29, where the packet may be reconstructed in a converter 66. From the converter 66, the packet is transferred to the bridge circuit 310. Within the bridge circuit 310, the header of the packet is examined for an ultimate destination. The bridge circuit 310 identifies the packet as being intended for the terminal 86. The bridge circuit 310, in turn, transfers the packet to the terminal 86 where the packet may be converted into a screen-pop which may be used to present customer information to the agent at substantially the same time as call arrival.

In a similar manner, the agent may collect customer information for transfer to the host 20. As the agent enters information, the terminal 86 composes packet messages directed to the host 20. The packets may then be transferred to the bridge circuit 310. The bridge circuit 310 by reference to the header of the packet message transfers the packet to the converter 66 which maps the packet into the control slots for transfer to the first RSC 28. Within the first RSC 28, the packet is reconstructed and reformatted into the first format for transfer to the CPU 36 of the ACD 22. The CPU 36 receives the packet and, in turn, transfers the packet to the host 20.

As another example, the RSCs 28, 29 may be used to provide a remote interface (for a primary rate interface (PRI)) with the PSTN 12. Such a situation may be useful where, for example, the ACD 22 is located in Chicago, Ill. and it were desirable to allow callers in Cleveland, Ohio to access the ACD 22 without long distance charges. In such a case, the wide-bandwidth communications channel 34 would link the ACD 22 in Chicago to a PRI interface in Cleveland. The line card 76 providing the PRI interface would be a PRI card. The resource 30 may be a local trunk connection, in Cleveland, to the PSTN 12.

Under the example, calls in Cleveland would arrive on the trunk interface 31 with the PSTN 12 in Cleveland may consist of a T1 connection with 24 channels. Channels 1–23 may be made up of voice information, while channel 24 carries call routing information. Alternatively, the T1 connection may include 24 voice channels with channel associated signaling using bit stealing (channel associated signaling may be depicted as shown in FIG. 2 by reference number 77). Where bit stealing is used, the line card 76 may function to segregate the signaling information from the voice data.

Be segregating the call control and channel associated information from the PCM data, the RSCs 28, 29 may compress the PCM voice data of channel 1–23 of the trunk line 31 to a smaller number of channels (e.g., 1–12) of the wide-bandwidth communications channel 34. Compressing the voice data to a smaller number of slots offers considerably more capacity for control information transmitted across the first portion of slots.

Under the illustrated embodiment, the line card 76 in Cleveland receives the information on the trunk line and rearranges it into the first format for transfer across the interface 84 to the RSC 29. Within the RSC 29, the converter 66 captures both the call routing information and also the channel associated information as signaling information.

From the CPU 80 of the PRI line card 76, the CPU 70 may receive call routing information from the 24 channels of the trunk connection 31. Upon receiving the call routing and channel associated information, the CPU 70 composes a series of packets directed to the CPU 58 of the RSC 28.

The packets composed by the CPU 70 are sent to the converter 66 where they are mapped into the first portion of the slots of the communication channel 34. The PCM voice data from the trunk 31 are mapped into the second portion of the slots of the communication channel 34.

At the first RSC 28, the packets are transferred to the CPU 58. The call control information may be converted into the first format and transferred to the CPU 36.

In another embodiment of the invention, the RSCs 28, 29 function to pass on RESET commands from the ACD 36. As is well known, a RESET command on the bus of the ACD 22 would normally cause a reset of all associated CPUS. Under the illustrated embodiment, a bus reset (BR) device 59, 71 is associated with the CPU 58, 70 of each RSC 28, 29 to allow the RSCs 28, 29 to pass on the RESET without itself resetting.

Prior devices accomplish a RESET by outputting the RESET sequence to an associated external circuit which pulls a non-maskable reset connection of the CPU to a reset state. Under the illustrated embodiment, the BR 59, 71, upon receipt of the RESET command functions to trigger a programmed interrupt. The programmed interrupt functions to send a reserved code packet directed from the first RSC 28 to the second RSC 29. Within the second RSC 29, receipt of the reserved code packet causes the CPU 70 of the second RSC 29 to generate a RESET under the first format across the interface 84 with the line card 76.

A specific embodiment of a method and apparatus for a method of exchanging control information and voice information between an automatic call distributor and line card in a remote location according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of exchanging control information and voice data between an automatic call distributor and a line card of the automatic call distributor located at a site remote from the automatic call distributor through a wide-bandwidth communication channel, such method comprising the steps of:

allocating at least a first portion of the bandwidth of the wide-bandwidth communication channel for the control information and at least a second portion of the bandwidth to voice data;

transceiving interprocessor control information between a controller of the automatic call distributor and a controller of the line card under a packet data format within the first portion of the bandwidth allocated for control information; and transceiving the voice data under a dedicated channel format within the second portion of the bandwidth between the automatic call distributor and line card.

2. The method of exchanging control information and voice data as in claim 1 further comprising dividing the wide bandwidth communication channel into a plurality of repeating timeslots.

3. The method of exchanging control information and voice data as in claim 2 wherein the step of allocating at least part of the bandwidth of the wide-bandwidth communication channel to control information and at least part to voice data further comprises allocating at least some of the repeating timeslots for control information and at least some other repeating timeslots for voice data.

4. The method of exchanging control information and voice data as in claim 1 further comprising converting the transceived interprocessor control information between a first format of a bus of the automatic call distributor and the packet format of the wide bandwidth communication channel.

5. The method of exchanging control information and voice data as in claim 4 further comprising converting transceived interprocessor control information between the packet format of the wide bandwidth communication channel and the first format of a bus of the line card.

6. The method of exchanging control information and voice data as in claim 5 further comprising transceiving signaling control information for the voice data under the packet data format through the first portion of the bandwidth allocated for control information.

7. The method of exchanging control information and voice data as in claim 6 further comprising converting the transceived signaling control information between the first format of the bus of the automatic call distributor and the packet format of the wide-bandwidth communication channel.

8. The method of exchanging control information and voice data as in claim 7 further comprising converting the transceived signaling control information between the packet format of the wide bandwidth communication channel and the first format of a bus of the line card.

9. The method of exchanging control information and voice data as in claim 8 further comprising converting the transceived voice data between the first format of the bus of the automatic call distributor and the dedicated channel format of the wide-bandwidth communication channel.

10. The method of exchanging control information and voice data as in claim 9 further comprising converting the transceived voice data between the dedicated channel format of the wide bandwidth communication channel and the first format of a bus of the line card.

11. The method of exchanging control information and voice data as in claim 1 further comprising allocating a third portion of the bandwidth of the wide-bandwidth communication channel for transmission of data streams between data terminals at the automatic call distributor and the remote site.

12. The method of exchanging control information and voice data as in claim 11 wherein the step of allocating the third portion of bandwidth further comprises providing a bridge interface to said third portion of bandwidth to couple a local area network between data terminals of the automatic call distributor and the remote site.

13. The method of exchanging control information and voice data as in claim 11 wherein the step of allocating the third portion of the bandwidth further comprises allocating an asynchronous-to-synchronous data interface to said third portion of bandwidth to couple an asynchronous data connection between the ACD and the remote site.

14. Apparatus for exchanging control information and voice data between an automatic call distributor and a line card of the automatic call distributor located at a site remote from the automatic call distributor through a wide-bandwidth communication channel, such apparatus comprising:

means for allocating at least a first portion of the bandwidth of the wide-bandwidth communication channel for the control information and at least a second portion of the bandwidth to voice data;

means for transceiving interprocessor control information between a controller of the automatic call distributor and a controller of the line card under a packet data format within the first portion of the bandwidth allocated for control information; and means for transceiving the voice data under a dedicated channel format within the second portion of the bandwidth between the automatic call distributor and line card.

15. The apparatus for exchanging control information and voice data as in claim 14 further comprising means for dividing the wide bandwidth communication channel into a plurality of repeating timeslots.

16. The apparatus for exchanging control information and voice data as in claim 15 wherein the means for allocating at least part of the bandwidth of the wide-bandwidth communication channel to control information and at least part to voice data further comprises means for allocating at least some of the repeating timeslots for control information and at least some other repeating timeslots for voice data.

17. The apparatus for exchanging control information and voice data as in claim 14 further comprising means for converting the transceived interprocessor control information between a first format of a bus of the automatic call distributor and the packet format of the wide bandwidth communication channel.

18. The apparatus for exchanging control information and voice data as in claim 17 further comprising means for converting transceived interprocessor control information between the packet format of the wide bandwidth communication channel and the first format of a bus of the line card.

19. The apparatus for exchanging control information and voice data as in claim 18 further comprising means for transceiving signaling control information for the voice data under the packet data format through the first portion of the bandwidth allocated for control information.

20. The apparatus for exchanging control information and voice data as in claim 19 further comprising means for converting the transceived signaling control information between the first format of the bus of the automatic call distributor and the packet format of the wide-bandwidth communication channel.

21. The apparatus for exchanging control information and voice data as in claim 20 further comprising means for converting the transceived signaling control information between the packet format of the wide bandwidth communication channel and the first format of a bus of the line card.

22. The apparatus for exchanging control information and voice data as in claim 21 further comprising means for converting the transceived voice data between the first format of the bus of the automatic call distributor and the dedicated channel format of the wide-bandwidth communication channel.

23. The apparatus for exchanging control information and voice data as in claim 22 further comprising means for converting the transceived voice data between the dedicated channel format of the wide bandwidth communication channel and the first format of a bus of the line card.

24. The apparatus for exchanging control information and voice data as in claim 14 further comprising means for allocating a third portion of the bandwidth of the wide-bandwidth communication channel for transmission of data streams between data terminals at the ACD and remote sites.

25. The apparatus for exchanging control information and voice data as in claim 24 wherein the means for allocating the third portion of bandwidth further comprises means for providing a bridge interface to said third portion of bandwidth to extend a local area network connection from the remote site.

26. The apparatus for exchanging control information and voice data as in claim 25 wherein the means for allocating the third portion of the bandwidth further comprises means for allocating an asynchronous-to-synchronous data interface to said third portion of bandwidth to extend asynchronous data connections from the ACD to the remote site.

27. Apparatus for exchanging control information and voice data through a wide-bandwidth communication channel between an automatic call distributor having a controller and a line card of the automatic call distributor which also has a controller, said line card being located at a site remote from the automatic call distributor, such apparatus comprising:
the wide-bandwidth communication channel divided into a first portion for transmission of the control information and into at least a second non-overlapping portion for transmission of the voice data;
a control transceiver adapted to transceive interprocessor control information between a controller of the automatic call distributor and a controller of the line card under a packet data format within the first portion of the bandwidth allocated for control information; and
a data transceiver adapted to transceive the voice data under a dedicated channel format within the second portion of the bandwidth between the automatic call distributor and line card.

28. The apparatus for exchanging control information and voice data as in claim 27 further comprising a multiplexer adapted to divide the wide bandwidth communication channel into a plurality of repeating timeslots.

29. The apparatus for exchanging control information and voice data as in claim 28 wherein the wide-bandwidth communication channel with the plurality of repeating timeslots further comprises a timeslot controller adapted to allocate at least some of the repeating timeslots for control information and at least some other repeating timeslots for voice data.

30. The apparatus for exchanging control information and voice data as in claim 27 further comprising a terminal interface disposed between the wide-bandwidth communication channel and the line card.

31. The apparatus for exchanging control information and voice data as in claim 30 further comprising a first protocol converter disposed within the automatic call distributor and adapted to convert transceived interprocessor control information between a first format of a bus of the automatic call distributor and the packet format of the wide bandwidth communication channel.

32. The apparatus for exchanging control information and voice data as in claim 31 further comprising a second protocol converter adapted to convert the transceived interprocessor control information between the packet format of the wide bandwidth communication channel and the first format of a bus of the line card.

33. The apparatus for exchanging control information and voice data as in claim 32 further comprising a second transceiver disposed within the automatic call distributor and adapted to transceive signaling control information for the voice data under the packet data format between the bus of the automatic call distributor and the first portion of the bandwidth allocated for control information.

34. The apparatus for exchanging control information and voice data as in claim 33 further comprising a third protocol converter disposed within the automatic call distributor and adapted to convert the transceived signaling control information between the first format of the bus of the automatic call distributor and the packet format of the wide-bandwidth communication channel.

35. The apparatus for exchanging control information and voice data as in claim 34 further comprising a fourth protocol converter adapted to convert the transceived signaling control information between the packet format of the wide bandwidth communication channel and the first format of a bus of the line card.

36. The apparatus for exchanging control information and voice data as in claim 35 further comprising a fifth protocol converter adapted to convert the transceived voice data between the first format of the bus of the automatic call distributor and the dedicated channel format of the wide-bandwidth communication channel.

37. The apparatus for exchanging control information and voice data as in claim 36 further comprising a sixth protocol converter disposed within the terminal interface and adapted to convert the transceived voice data between the dedicated channel format of the wide bandwidth communication channel and the first format of a bus of the line card.

38. The apparatus for exchanging control information and voice data as in claim 27 wherein the wide-bandwidth communication channel further comprising a third non-overlapping portion for transmission of data streams between data terminals located at the automatic call distributor and the remote site.

39. The apparatus for exchanging control information and voice data as in claim 38 wherein the third non-overlapping portion further comprises a bridge interface adapted to couple a local area network between the automatic call distributor and remote site through the third portion.

40. The apparatus for exchanging control information and voice data as in claim 39 further comprising an asynchronous-to-synchronous interface adapted to couple the third non-overlapping portion to the local area network.

41. A method of exchanging interprocessor control information and voice data between an automatic call distributor and a line card at a remote site through a wide-bandwidth communication channel, such method comprising the steps of:

dividing the wide-bandwidth communication channel into a plurality of repeating timeslots;

allocating at least some of the repeating timeslots for control information and at least some other repeating timeslots to voice data;

receiving interprocessor control information and voice data under a first format at a first end of the wide-bandwidth communication channel from one of the automatic call distributor and line card;

forming packet messages from the received interprocessor control information;

mapping the packet messages into the allocated timeslots for control messages and the voice data into the allocated timeslots for voice data;

recovering the interprocessor control information and voice data at a second end of the wide-bandwidth communication channel; and reformatting the interprocessor control information and voice data into the first format for receipt by one of the automatic call distributor and line card.

42. Apparatus for exchanging interprocessor control information and voice data between an automatic call distributor and a line card at a remote site through a wide-bandwidth communication channel, such apparatus comprising:

means for dividing the wide-bandwidth communication channel into a plurality of repeating timeslots;

means for allocating at least some of the repeating timeslots for control information and at least some other repeating timeslots to voice data;

means for receiving interprocessor control information and voice data under a first format at a first end of the wide-bandwidth communication channel from one of the automatic call distributor and line card;

means for forming packet messages from the received interprocessor control information;

means for mapping the packet messages into the allocated timeslots for control messages and the voice data into the allocated timeslots for voice data;

means for recovering the interprocessor control information and voice data at a second end of the wide-bandwidth communication channel; and means for reformatting the interprocessor control information and voice data into the first format for receipt by one of the automatic call distributor and line card.

* * * * *